May 30, 1950  R. E. DUFFY  2,509,630
EGG HOLDER WITH RECIPROCATING CUTTER
Filed July 30, 1946  3 Sheets-Sheet 1
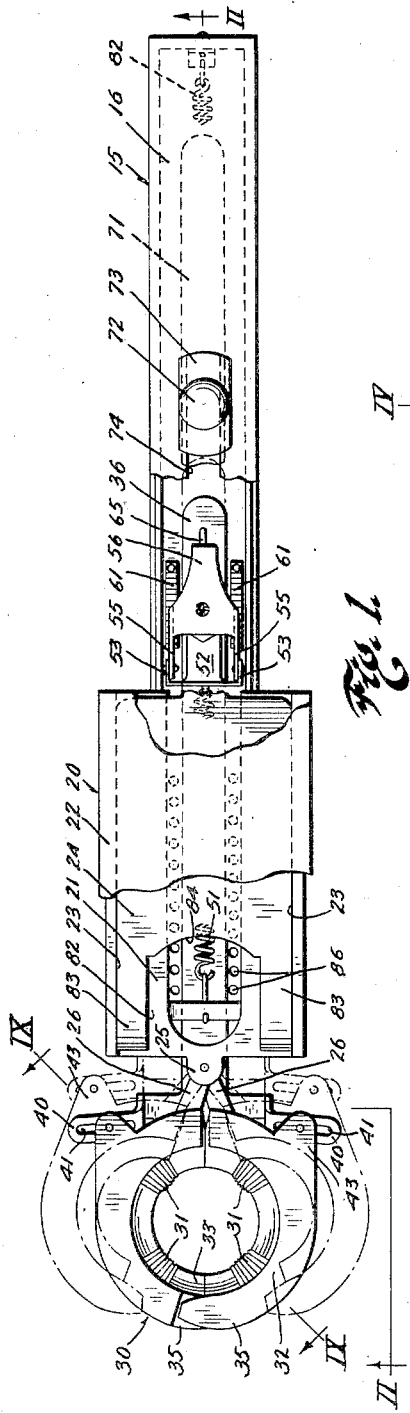
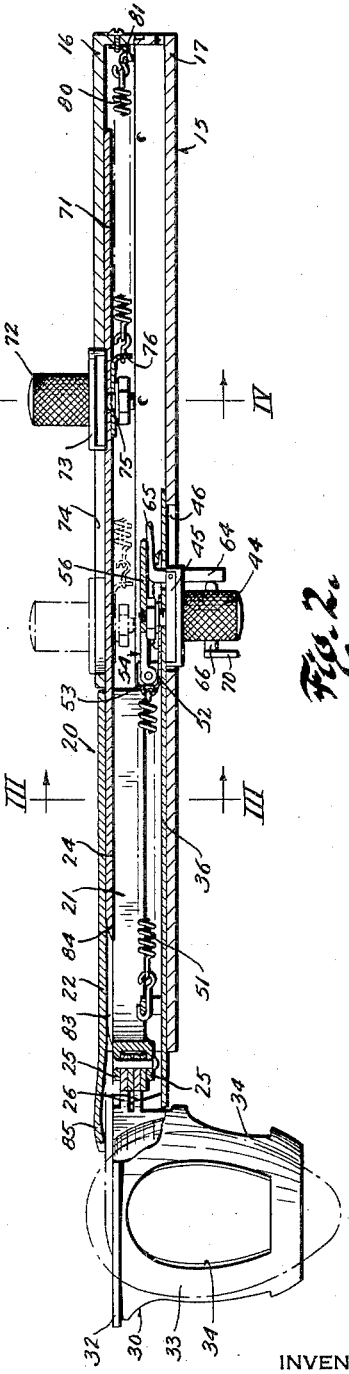
INVENTOR
Robert E. Duffy
BY
Beau, Brooks, Buckley & Beau
ATTORNEYS

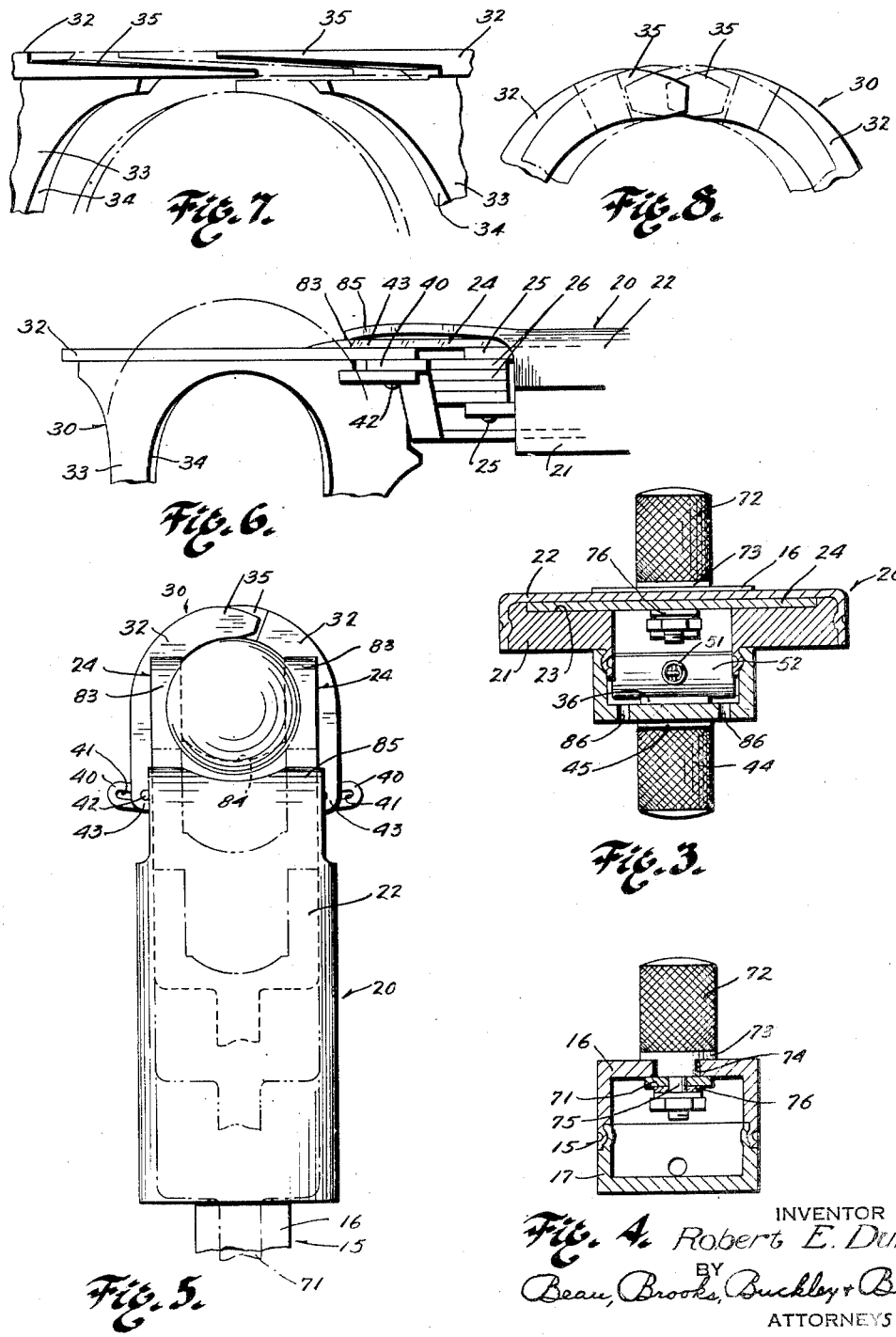

May 30, 1950          R. E. DUFFY          2,509,630
EGG HOLDER WITH RECIPROCATING CUTTER
Filed July 30, 1946          3 Sheets-Sheet 3
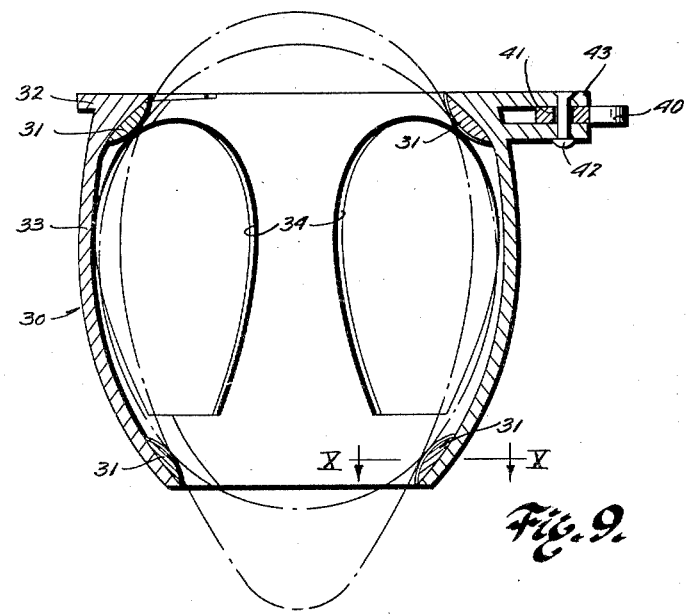
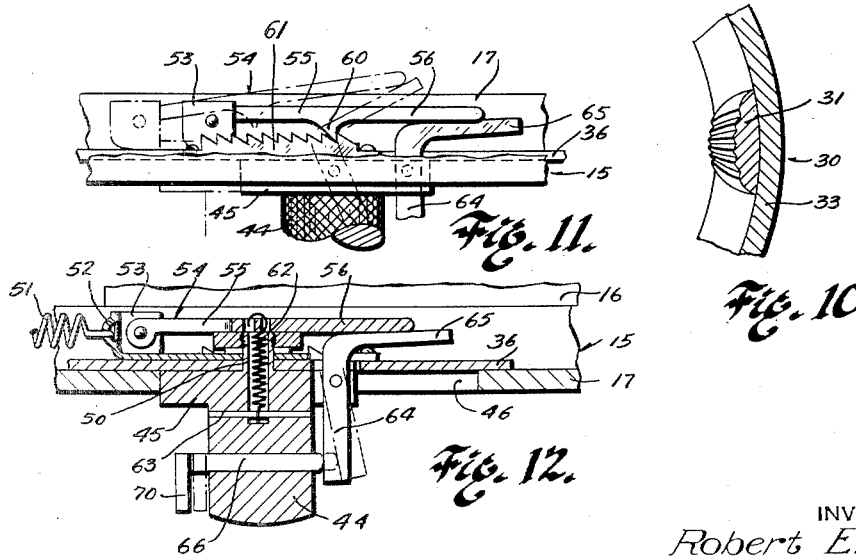
INVENTOR
Robert E. Duffy
BY
Bean, Brooks, Buckley & Bean
ATTORNEYS Patented May 30, 1950

2,509,630

UNITED STATES PATENT OFFICE 2,509,630

EGG HOLDER WITH RECIPROCATING CUTTER

Robert E. Duffy, Buffalo, N. Y.

Application July 30, 1946, Serial No. 687,163

2 Claims. (Cl. 146—2)

This invention relates to a kitchen utensil, and more particularly to an improved egg handling and opening tool such as may be conveniently used by the housewife and/or a restaurant or hotel chef.

A primary object of the present invention is to provide an improved utensil of the character described, whereby the user may more conveniently ladle eggs into and out of boiling water and decapitate the ends of handled eggs while either in their raw or cooked condition. Also another object of the invention is to provide a utensil embodying the aforesaid features, and which in addition is adapted to function as an egg server, in improved manner.

Another object of the present invention is to provide a utensil of the character described embodying improved means for severing an end portion of an egg shell so as to avoid rupturing of the yolk portion of the egg. Another object of the invention is to provide a utensil wherein the egg cutting knife element is so arranged as to sever the egg shell and overlying skin almost but not quite entirely around the circumference of the egg so as to leave a small portion of the egg shell and skin intact. Thus, the severed cap portion of the egg shell remains in hinged connection with the body of the egg shell, whereby the cut egg may be set into a dining dish with the cap still in place so as to retain the cooking heat within the egg until the diner lifts back the cap and spoons out the contents.

Another object of the invention is to provide in a utensil of the character described improved adjustable jaw means for holding an egg within the utensil. Another object of the invention is to provide improved jaw means including a specially related abutment device adapting the holder to firmly clasp different eggs of varying dimensional and proportional characteristics. Another object of the invention is to provide a utensil of the character described embodying improved jaw means for firmly holding eggs during the decapping process. Another object of the invention is to provide in a utensil of the character described improved knife means for cutting egg shells handled thereby.

The invention contemplates a kitchen utensil comprising essentially a handle-like element carrying at one end a pair of adjustable jaws, and lever means slidably carried by the handle member and operable to cause opening and closing of the jaws; and other lever means carried by the handle manually operable to cause an egg shell cutting knife to project from the handle portion into shell cutting engagement with an egg when held within the jaws. Thus, the utensil is adapted for a variety of uses. For example, an egg may be disposed within the jaw portion of the device, and then the utensil may be used simply as a ladle for dipping the egg into hot water so as to avoid scalding the hands of the user. Likewise, a boiled egg may be retrieved from a vessel containing boiling water, and then the top end of the egg may be partially severed by cutting the egg shell part way around the circumference. The cap portion of the egg shell may then be flipped back and the contents spooned out of the shell into a serving dish, or, if preferred, the cut egg may simply be carried in the utensil over to a holding dish and lowered into the dish upon release of the utensil jaws and served to the diner. The diner may thereupon fold back the cap of the egg shell and eat the contents at leisure. Or, a raw egg may be disposed within the holder jaws and the cap portion of the egg shell then cut by the knife, and then the raw contents of the egg may be poured into a vessel of boiling water for poaching purposes, or poured into a frying pan or the like. Thus, it will be appreciated that the utensil has a large variety of uses and at all times protects the hands of the user from stove heat and the like; and provides a most sanitary and convenient method of handling eggs between the cooking stove and the dining table.

The above objects and advantages have been accomplished by the device shown in the accompanying drawings, of which:

Fig. 1 is a plan view, partly in section, of my complete device;

Fig. 2 is a sectional elevation thereof taken on line II—II of Fig. 1;

Fig. 3 is an enlarged transverse sectional view taken on line III—III of Fig. 2;

Fig. 4 is a similar view taken on line IV—IV of Fig. 2;

Fig. 5 is a fragmentary plan view showing the knife in its fully extended operative position;

Fig. 6 is an enlarged fragmentary side elevation of the front portion of the device;

Fig. 7 is an enlarged fragmentary front elevation of the jaws;

Fig. 8 is a fragmentary plan view of the portions of the jaws shown in Fig. 7;

Fig. 9 is an enlarged sectional view taken through the jaws of my device on line IX—IX of Fig. 1;

Fig. 10 is a fragmentary sectional plan view of a portion of one of the jaw members and taken on line X—X of Fig. 9;

Fig. 11 is an enlarged fragmentary side elevation of the latching means for the jaw actuating member, with sections thereof broken away; and, Fig. 12 is a longitudinal sectional view of the details shown in Fig. 11 and taken on line II—II of Fig. 1.

My device comprises a handle casing 15 having an upper part 16 and a lower part 17 for enclosing portions of the mechanism of the device and for providing a suitable handle whereby the device may be manipulated while in use. The lower part 17 of the handle casing extends forwardly a distance substantially equal to the full length of the handle casing, whereas the upper part thereof is terminated at a point beyond the middle of the handle. Extending forwardly from the end of the upper part 16 of the casing handle is a knife casing 20 comprising a base part 21 and a cover part 22. The base part of the knife casing is suitably secured to the lower part 17 of the handle casing, and a recess 23 is preferably formed in the upper face of the body part and between it and the cover 22. The egg knife 24 is slidably disposed within this recess and actuated longitudinally therein by means to be hereinafter described.

The body part 21 of the knife casing is formed at its forward end and midway its width with spaced pivot lugs 25. Pivotally disposed between said pivot lugs are the pivot arms 26 of the egg holding jaws 30. These jaws are of shell-like formation and their inner surfaces when in their closed egg-engaging position are of ellipsoidal form. Each of these jaws is provided on its inner surface near the top and bottom thereof with a number of centralizing abutments 31 which project beyond the inner faces of the jaws and which, as clearly shown in Fig. 9, adapt the jaws to engage eggs of different sizes. In this figure, two eggs of extreme different sizes are shown by the dot and dash lines, and it will be seen that both eggs are firmly held near their ends by the engagement of the centralizing abutments, thereby preventing any rocking movement of the egg when being operated upon by the knife. The jaws are provided with flange tops 32 which lie in substantially the same plane when in their closed positions thereby forming a support for the cutting knife 24. The body part 33 of each of the jaws is formed with a number of elliptically shaped openings 34, whereby the water into which the device is dipped may have free unobstructed access to the egg when it is to be treated therein, or may freely run out of the jaws when the device is to be used to ladle the eggs into or out of a water bath. So as to be assured of having the flanges 32 completely encircling an egg of any size, each is formed with oppositely arranged wedge-shaped fingers 35 which, as shown in Figs. 7 and 8, overlap each other when the jaws are in closed position.

Slidably mounted within the lower part 17 of the handle housing is a jaw actuating member 36 which carries at its outer end two oppositely disposed actuating ears 40. Each of these ears is formed with an elongated slot 41 for engagement with a pin 42 carried by an actuating arm 43 formed on each of the jaws. As the actuating member 36 is reciprocated longitudinally with respect to the pivot lugs 25, it will be seen that the jaws will be opened or closed. A jaw actuating knob 44 having a slide 45 is slidably mounted within a slot 46 formed in the bottom part 17 of the handle casing. This knob is formed with a stud 50 which passes through the actuating member 36, suitable means being provided for securing the stud to the actuating member. When this actuating member is moved forwardly relatively to the handle casing, the jaws are closed in egg-engaging position, and since it is desirable that this position be yieldable, a jaw actuating spring 51 is mounted within the lower part 17 of the handle, having one end anchored to the handle casing part 17 and the other end attached to a pivot member 52. This pivot member is secured to the jaw actuating member 36 and the spring, therefore, also serves to keep the jaw members closed. It is desirable that the jaw members be held in locked position when holding an egg, and while it is being operated upon by the knife. Suitable ratchet locking means are therefore provided, as clearly shown in the drawings and particularly in Figs. 11 and 12. The pivot member 52 extends substantially the full width of the space within the lower part 17 of the handle casing, and it is provided with pivot ears 53 at each side. Pivotally mounted between the ears 53 is a latch lever 54. This lever has two spaced side members 55 and a centrally arranged connecting arm 56. Each of the side members 55 is formed with a downwardly extending ratchet tooth 60, each of which engages a ratchet rack 61. The racks are mounted within the lower part 17 of the handle casing, and one is arranged on each side of the jaw actuating member 36. A latch-engaging spring 62 is mounted within the actuating knob 44. This spring has its upper end engageable with the connecting arm 56 of the latch lever 54, and its lower end engageable with a pin 63 carried by the knob, thus serving to keep the latch lever 54 pressed downwardly so as to normally retain the teeth 60 in engagement with the teeth of the ratchet racks 61, thereby locking the jaw actuating member in its forwardly extending position. Trigger means are provided for releasing the latch lever from the ratchet racks, and comprises a trigger lever 64 pivotally carried by the slide 45 of the knob 44 and having a rearwardly extending arm 65 at its upper end. This arm engages the under side of the arm 56 of the latch lever and serves to raise it against the tension of the spring 62 when the trigger is operated about its pivot. A trigger pin 66 is slidably mounted within the knob 44 and in registration with the trigger lever 64. This pin is projected forwardly by the tension of the spring 62 acting through the medium of the trigger lever 64 and latch lever 54. A finger piece 70 is formed at the forward end of the pin whereby it may be conveniently pushed backwardly by the finger of the operator. When the pin is pushed backwardly, the ratchet teeth 60 will be released from the engaging teeth of the ratchet racks 61, and the jaw actuating member 36 may be moved backwardly within the lower part 17 of the handle casing, thereby opening the jaws 30 either to engage an egg for ladling or cooking purposes or to discharge the egg or the shell from the device. As soon as the operator releases his finger from the finger piece 70, the spring 51 will again draw the jaws 30 into egg-engaging positions where they will be locked by the ratchet means as above described.

As hereinbefore pointed out, it is the object of the invention to cut the egg shell near the larger end thereof and only partially sever it so that the cover thereby formed may be lifted by the diner. In order to accomplish this, the knife 24 which is slidably disposed within the base part 21 of the knife casing is formed with a rearwardly extending knife shank 71, means being provided for reciprocating the shank. Such means may comprise a knife actuating knob 72 mounted on the upper side of the part 16 of the handle casing and formed with a slide 73 for engagement with a slot 74 formed in the wall of the casing part. This knob is provided with a stud 75 which passes through the shank 71 of the knife and also through a spring clip 76 which is movable with the shank and which is secured to the shank and to the knob by suitable fastener means. A knife retracting spring 80 is mounted within the upper part 16 of the handle casing, having one of its ends attached to the spring clip 76 and its other end anchored to a stationary clip 81, whereby when the knife is moved forwardly by pressure of the finger of the operator upon the knob 72, it will be retracted by the spring to its normal inactive position when released.

The knife 24 is formed with a centrally arranged recess 82 at its forward end, thereby providing spaced cutter arms 83. The cutter arms are connected by a laterally arranged concave cutting edge 84, bounding the inner end of the recess 82. This cutting edge and the forward ends of the cutter arms 83 are preferably sharpened as shown in Fig. 2. The width of the recess 82 and therefore the spacing of the cutter arms 83 is such that the cutting edges of the arms will be forced through the side portions of the shell of the egg and the cutting edge 84 will sever that portion of the shell between such side portions at the inner periphery of the egg. In order to provide for the removal of water which may accumulate in the casing parts, I provide a plurality of apertures 86 through the bottom wall of the casing part 17 near the forward end thereof and also an aperture 87 in the rear wall thereof through which the water may drain. From the drawings, it will be clear that since that portion of the egg shell which lies between the cutting arms 83 at the outside of the egg is not severed, a partially attached cover is thus provided which remains attached to the egg shell, whereby if desired, the egg may be removed from the device and placed in a serving dish or egg cup, leaving the cap or cover to be removed by the diner at his pleasure. Furthermore, it will be clear that the place at which the incisions are made in the egg shell is so positioned as to prevent the yoke of the egg from being ruptured, thereby adapting the device for use with eggs that are to be poached. When so used, the raw egg is held within the jaws with the projecting end of the egg extending upwardly, and the knife is pushed forwardly to egg-engaging and shell-severing position, thereby forming a partially attached shell cap or cover. Upon reversing the position of the egg over a cooking vessel, the contents of the egg will push the cover open and be deposited in the vessel containing the boiling water, many times without the cover becoming detached from the remainder of the egg shell.

The forward end of the cover 22 of the knife casing extends forwardly beyond the forward end of this casing and is so shaped as to resiliently bear down upon the upper surface of the knife 24, whereby when the knife is retracted from its cutting position, the forward edge of the cover will act as a wiper to clean the blade of particles of egg remaining thereon. The above described cutting action of the knife is clearly shown in Fig. 5 where the knife is shown in its full cutting position in relation to an egg held within and between the jaws 30.

While I have shown spring means for retracting the knife, and spring means for moving the jaws to their closed positions, it is obvious that these parts may be manually operated to both of their extreme positions. Furthermore, while I have shown a helical latch-engaging spring mounted within the knob 44, a flat spring may be carried by the pivot member 52 and extended over and in resilient engagement with the latch lever to press the teeth thereof into engagement with the teeth of the ratchet racks. These and other modifications of the details herein shown and described may be made without departing from the spirit of the invention or the scope of the appended claims.

What is claimed is:

1. A utensil comprising a handle, a knife casing carried by said handle, egg-holding jaws pivotally attached to the forward end of said handle, means for opening and closing said jaws, said jaws being so formed as to permit one end of the egg to project beyond the end thereof, a knife slidably carried by said knife casing and movable across the upper end faces of both of the jaws to engage only the projecting end of the egg, means for reciprocating said knife, said knife casing comprising a base part secured to the lower part of said handle, and a cover part, and said base part and said cover part being so formed as to slidably hold and guide said knife, and said cover part being formed at the forward end thereof with a wiper for engagement with the top surface of said knife when the same is moved to its retracted position.

2. A utensil comprising a handle including a casing having a lower part extending substantially the full length of said handle, an upper part extending forwardly a portion of the length of said handle, a knife casing carried by said lower casing part and extending forwardly from said upper casing part, egg-holding jaws pivotally attached to the forward end of said handle, means for opening and closing said jaws, said jaws being so formed as to permit one end of the egg to project beyond the end thereof, a knife slidably carried by said knife casing and movable across the upper end faces of both of the jaws to engage only the projecting end of the egg, means for reciprocating said knife, said knife casing comprising a base part secured to the lower part of said handle casing, and a cover part, said base part and said cover part being so formed as to slidably hold and guide said knife, and said cover part being formed at the forward end thereof with a wiper for engagement with the top surface of said knife when the same is moved to its retracted position.

ROBERT E. DUFFY.

REFERENCES CITED

The following references are of record in the file of this patent:

UNITED STATES PATENTS

| Number | Name | Date |
| --- | --- | --- |
| 877,389 | Werd | Jan. 21, 1908 |
| 1,372,111 | Van Melsen | Mar. 22, 1921 |
| 1,918,463 | Foster | July 18, 1933 |
| 2,191,170 | Keehn et al. | Feb. 20, 1940 |

FOREIGN PATENTS

| Number | Country | Date |
| --- | --- | --- |
| 5,714 | Great Britain | Mar. 16, 1899 |
| 26,158 | Denmark | June 21, 1920 |
| 602,145 | France | Dec. 18, 1925 |